(12) United States Patent
Charier et al.

(10) Patent No.: US 10,533,573 B2
(45) Date of Patent: Jan. 14, 2020

(54) FAN MODULE WITH VARIABLE PITCH BLADES

(71) Applicant: SAFRAN AIRCRAFT ENGINES, Paris (FR)

(72) Inventors: Gilles Alain Marie Charier, La Grande Paroisse (FR); Kevin Morgane Lemarchand, Melun (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 56 days.

(21) Appl. No.: 15/982,866

(22) Filed: May 17, 2018

(65) Prior Publication Data
US 2018/0335046 A1  Nov. 22, 2018

(30) Foreign Application Priority Data
May 18, 2017 (FR) .................. 17 54380

(51) Int. Cl.
 *F04D 29/36* (2006.01)
 *F02K 3/06* (2006.01)
 (Continued)

(52) U.S. Cl.
 CPC .............. *F04D 29/362* (2013.01); *F02K 3/06* (2013.01); *F04D 29/056* (2013.01);
 (Continued)

(58) Field of Classification Search
 CPC .... F04D 29/362; F04D 29/056; F04D 29/061; F04D 29/325; F04D 29/063;
 (Continued)

(56) References Cited

U.S. PATENT DOCUMENTS 5,272,868 A   12/1993  Ciokajlo et al.
8,225,593 B2   7/2012  Le Hong et al.
(Continued)

FOREIGN PATENT DOCUMENTS

FR  2 918 120 A1  1/2009
FR  2 977 636 A1  1/2011
WO  2014/013201 A1  1/2014

OTHER PUBLICATIONS

Preliminary Search Report and Written Opinion dated Jan. 25, 2018 for French Application No. 1754380, filed May 18, 2017, 7 pages.

*Primary Examiner* — Eldon T Brockman
(74) *Attorney, Agent, or Firm* — Christensen O'Connor Johnson Kindness PLLC

(57) ABSTRACT

Disclosed herein is a fan module with variable pitch blades for a propulsion unit, the fan module comprising a rotor carrying the blades and comprising an inner shaft and an outer casing defining between them a space, a control device for controlling the pitch of the blades, and a feathering device for feathering the blades. The rotation of the rotor is guided by a bearing, and the module further comprises means for recovering and guiding a liquid lubricant of the bearing, with the recovery and guidance means being configured to recover and guide said lubricant from an axial upstream end of the casing, axially from upstream to downstream and radially from the inside to the outside, under the centrifugal effect.

11 Claims, 7 Drawing Sheets

(51) Int. Cl.
*F04D 29/056* (2006.01)
*F04D 29/06* (2006.01)
*F04D 29/32* (2006.01)

(52) U.S. Cl.
CPC ......... *F04D 29/061* (2013.01); *F04D 29/325* (2013.01); *F05D 2220/323* (2013.01)

(58) Field of Classification Search
CPC ............... F04D 29/323; F05D 2260/74; F05D 2220/323; F05D 2220/36; F05D 2260/77; F05D 2260/79; F02K 1/66; F01D 21/14; F01D 7/00; F01D 25/16; F01D 25/18; B64C 11/001; B64C 11/30; B64C 11/06; B64C 11/325

See application file for complete search history.

(56) References Cited

U.S. PATENT DOCUMENTS

| | | |
|---|---|---|
| 9,884,675 B2 * | 2/2018 | Curlier .................. B64C 11/306 |
| 2014/0205457 A1 | 7/2014 | Curlier et al. |
| 2015/0219014 A1 | 8/2015 | Belmonte et al. |

\* cited by examiner

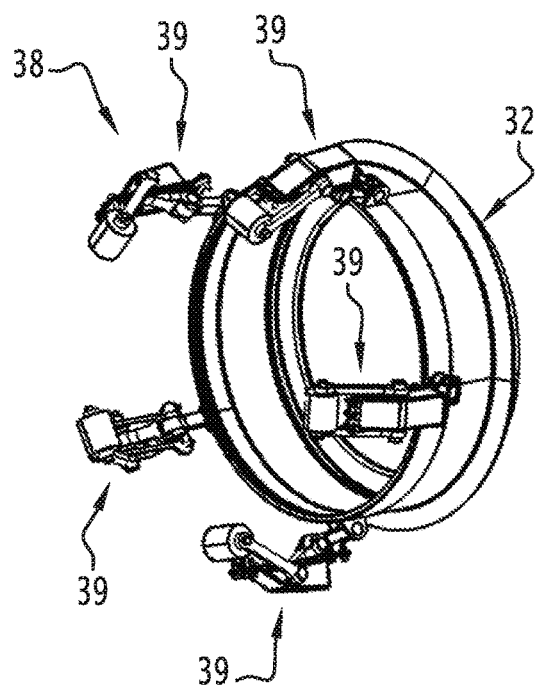 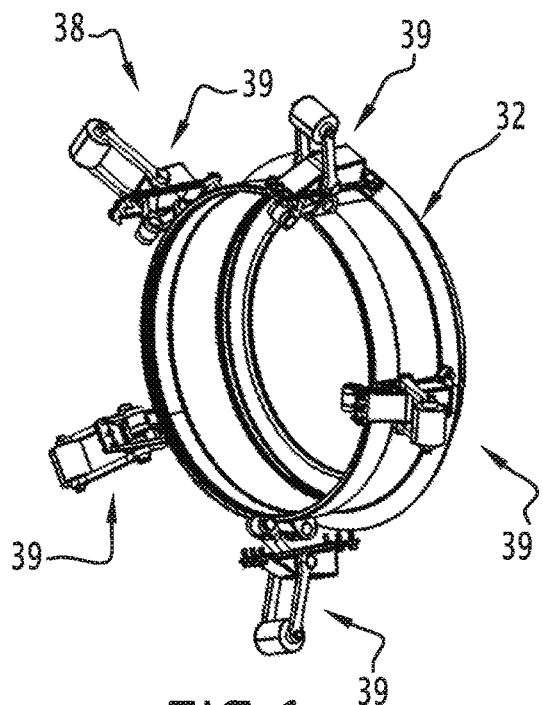
FIG.5  FIG.6
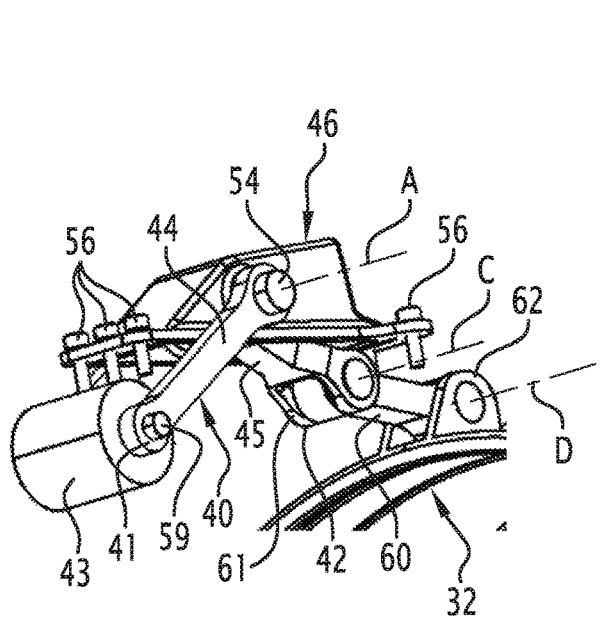 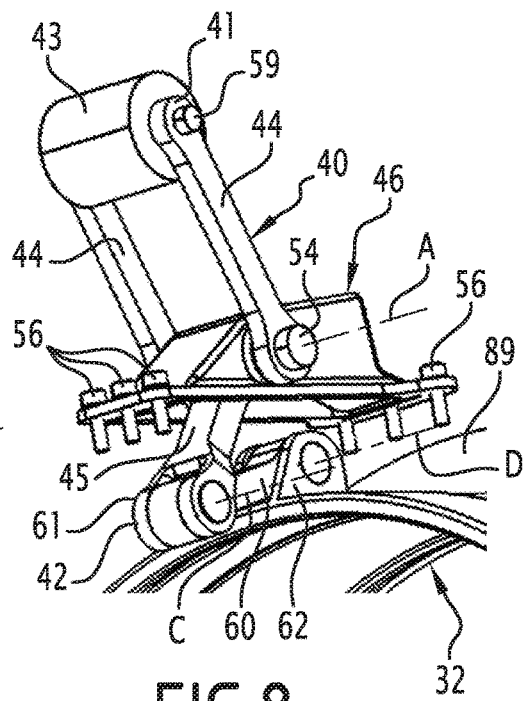
FIG.7  FIG.8

FAN MODULE WITH VARIABLE PITCH BLADES

TECHNICAL FIELD

The present disclosure concerns a ducted fan module with variable pitch blades for a propulsion unit, and more specifically a feathering device for blades that is suitable for such a fan.

BACKGROUND

A fan equipped with variable pitch blades makes it possible to adjust the pitch (and more specifically the pitch angle) of the blades depending on flight parameters, and thus to optimize the operation of the fan, and of the propulsion unit in general in which such a fan is incorporated. As a reminder, the pitch angle of a blade corresponds to the angle, in a longitudinal plane perpendicular to the axis of rotation of the blade, between the chord of the blade and the plane of rotation of the fan.

In order to be certified, such a fan must include a feathering device for feathering the blades, in other words a device for positioning the blades in a position in which said blades are nullified as much as possible with respect to the direction of advance. In general, in the feathered position, the pitch angle of the blades is 90°. The blades are, for example, set in the feathered position during a failure (for breakdown) of the pitch control device of the blades (for example a failure of a hydraulic actuator) in order that said blades offer the least possible resistance (drag).

In order to increase the performance of the fan, engine manufacturers are continually seeking to reduce the hub ratio of the fan. This hub ratio is the quotient of the diameter of the outer envelope of the feet of the blades at the leading edge of the blades, divided by the diameter of the circle passing through the outer radial ends of these blades. For an equal fan diameter, the reduction in the hub ratio, i.e. in the diameter of the outer envelope, implies an increase in the suction cross-section of the fan, in other words an increase in the treated flow, and consequently an increase in its propulsive performance.

Conventionally, the feathering device of the blades is located, in an enclosure, radially located between the control device for the pitch of the blades and the blade pivots, the blade pivots being specific to each blade or common to all blades.

The fan comprises a rotor that can move with respect to a fixed housing, the rotor carrying a series of variable-pitch blades. The rotation of the rotor is guided with respect to the fixed housing by means of a plurality of bearings. Given the operating conditions, namely heavily loaded bearings subject to high velocities, the bearings require lubrication by means of a liquid lubricant (generally oil).

However, the lubricant must not adversely affect the operation of the internal devices (and in particular of the device for feathering the blades) present in the enclosure, for example by contaminating these devices through a deposit of impurities. On the other hand, the lubricant must not remain trapped (or stored) in the cavities of the enclosure so as not to create imbalances harmful to the dynamic equilibrium of the rotor of the fan.

Examples of related systems and devices can be found in documents US 2014/205457 A1, FR 2977636 A1, WO 2014/013201 A1, FR2918120 A1, and U.S. Pat. No. 5,272,868, the complete disclosures of which are incorporated herein by reference.

In one aspect, the present disclosure provides a fan module which responds to the above-mentioned constraints.

SUMMARY

To this effect, the disclosure proposes a fan module with variable pitch blades for a propulsion unit with a longitudinal axis X, said module comprising:
- a rotor carrying the blades, and comprising an annular inner shaft and an annular outer casing extending around the shaft, and an axial upstream end of the shaft is connected to an axial upstream end of the casing, the shaft and the casing defining between them an annular space;
- a control device for controlling the pitch of the blades, said device being situated in said space and comprising a load transfer bearing;
- a feathering device for feathering the blades, in particular in the case of failure of the control device, situated upstream of the load transfer bearing;
- the rotation of the rotor being guided with respect to the housing by at least one first bearing situated in the vicinity of the axial upstream ends, said first bearing having an inner diameter that is less than the inner diameter of the load transfer bearing and being situated upstream of the feathering device of the blades;
- characterized in that the module comprises means for recovering and guiding a liquid lubricant of the bearing, the recovery and guidance means being configured to recover and guide said lubricant from said axial upstream end of the casing, axially from upstream to downstream and radially from the inside to the outside, under the centrifugal effect.

Such recovery and guidance means of the lubricant, located in the enclosure, prevents, in particular, the feathering device from being contaminated by the lubricant, for example through a deposit of impurities.

In addition, the lubricant also flows inside the enclosure following a trajectory determined in such a way as to not have undesired storage zones, causing imbalances harmful to the dynamic equilibrium of the rotor of the fan.

Controlling the routing of the lubricant also makes it possible to minimize the quantity of lubricant required for lubrication of the bearings.

The fan module may further comprise one or more of the following features, taken singularly or in combination with each other:
- the recovery and guidance means comprise an annular inner deflector rigidly connected to the casing and an annular outer deflector rigidly connected to the control device, the outer deflector being capable of at least partially enclosing the inner deflector;
- the outer deflector comprises a collar screwed into an outer synchronization ring of the control device, and a downstream face of the collar bears against an outer ring of the load transfer bearing and an upstream face of the collar bears against axial retaining means;
- said downstream face comprises radial notches for passage of the lubricant and an inner circumferential surface of the outer synchronization ring facing the outer ring of the load transfer bearing comprises axial notches for passage of the lubricant;
- the rotation of the rotor is guided with respect to the housing by at least a second and a third bearing situated downstream of the load transfer bearing, said third bearing having an inner diameter greater than the inner diameter of the load transfer bearing;

the third bearing guides the casing with respect to the housing, the third bearing is a rolling bearing comprising an outer ring and an inner ring separated by rolling elements, said outer ring of the rolling bearing is mounted in an annular crown attached to the housing, and in that the inner ring of said rolling bearing is mounted on an annular platform attached to the casing;

the platform comprises a plurality of openings for passage of the lubricant;

the casing comprises a ring having support bases for the blades, the casing comprising, between two successive bases, an axial path for passage of the lubricant;

at least one of said bearings is lubricated via a nozzle.

DESCRIPTION OF THE DRAWINGS

The foregoing aspects and many of the attendant advantages of this disclosure will become more readily appreciated as the same become better understood by reference to the following detailed description, provided by way of a non-limiting example and with reference to the attached drawings, in which:

FIG. 5 is a detailed perspective view of the device for feathering blades, of FIGS. 1 and 3;

FIG. 6 is a detailed perspective view of the device for feathering blades, of FIGS. 2 and 4;

FIG. 7 is a detailed perspective view of the mechanism of the device for feathering blades, of FIGS. 1, 3 and 5;

FIG. 8 is a detailed perspective view of the mechanism of the device for feathering blades, of FIGS. 2, 4 and 6;

DETAILED DESCRIPTION

Figure 1:
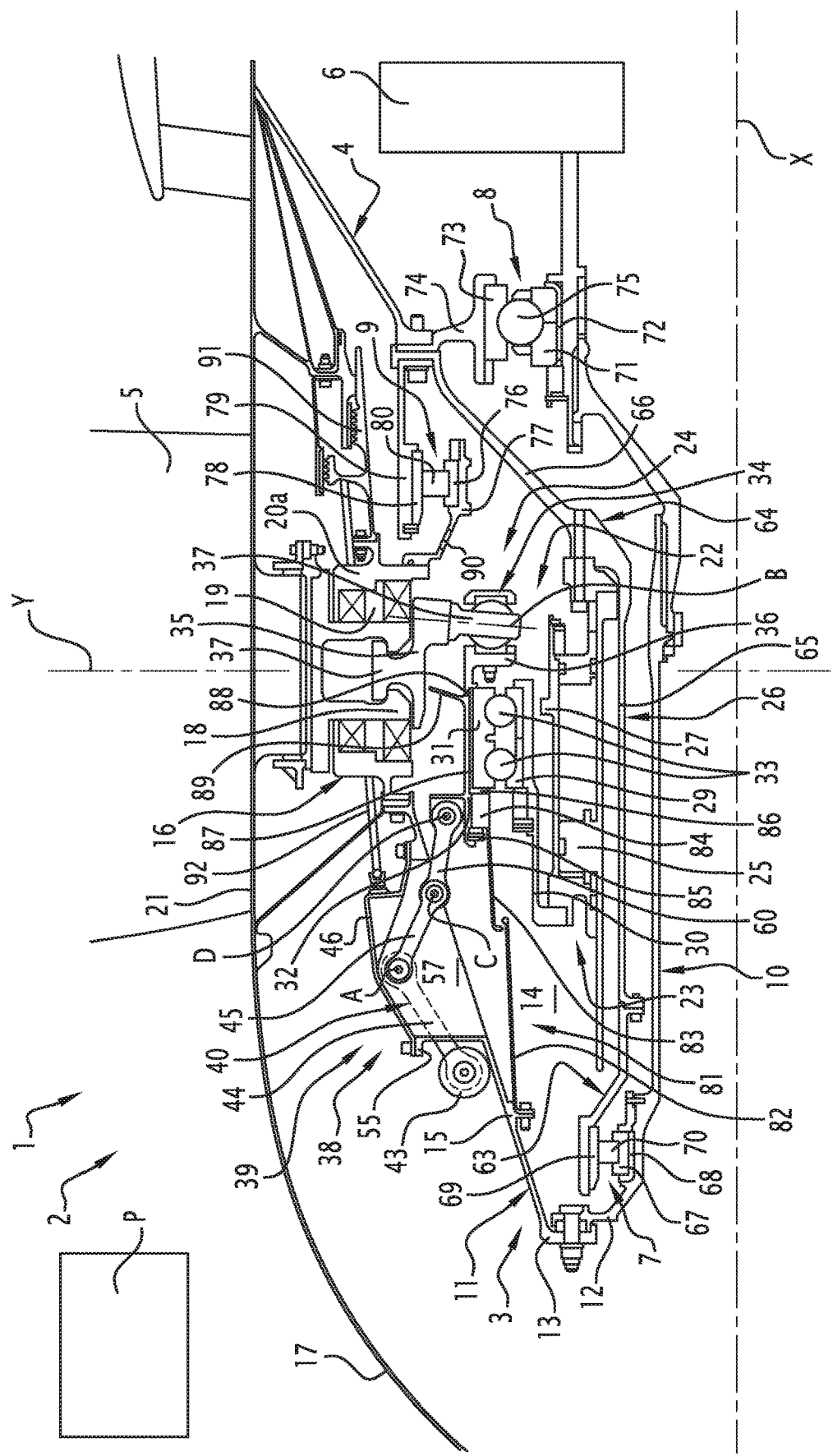
FIG. 1 is an axial (or longitudinal) half-section view of a fan module comprising a device for feathering blades, in a first position, in an axial plane passing through the axis of rotation of a blade of the fan.

FIG. 1 illustrates a ducted fan 1 of a propulsion assembly 2 with longitudinal axis X. The fan 1 comprises a rotor 3 that can move around the axis X with respect to a fixed housing 4, the rotor 3 carrying a series of variable pitch blades 5. In this case, the fan 1 is located upstream of the engine portion of the propulsion unit 2 which comprises, for example, consecutively from upstream to downstream, a gas generator and a power turbine which drives the rotor 3 of the fan 1 via a speed reducer 6.

By convention, in the present application, the terms "upstream" and "downstream" are defined with respect to the direction of movement of gases in the fan 1 (or propulsion unit 2). Similarly, by convention in the present application, the terms "inner" and "outer", "inside" and "outside" are defined radially with respect to the longitudinal (or axial) axis X of the propulsion unit 2, which is in particular the axis of rotation of the rotors, compressors and turbines of the gas generator.

The rotation of the rotor 3 is guided with respect to the fixed housing 4 by means of a first bearing 7 situated upstream and at least a second and a third bearing 8, 9 situated downstream. The rotor 3 comprises an inner annular shaft 10 centered on the axis X, and an annular outer casing 11 centered on the axis X and extending around the shaft 10. An upstream axial end 12 of the shaft 10 is clamped to an upstream axial end 13 of the casing 11, the shaft 10 and the casing 11 defining therebetween an annular space 14 commonly called the "oil enclosure".

Figure 2:
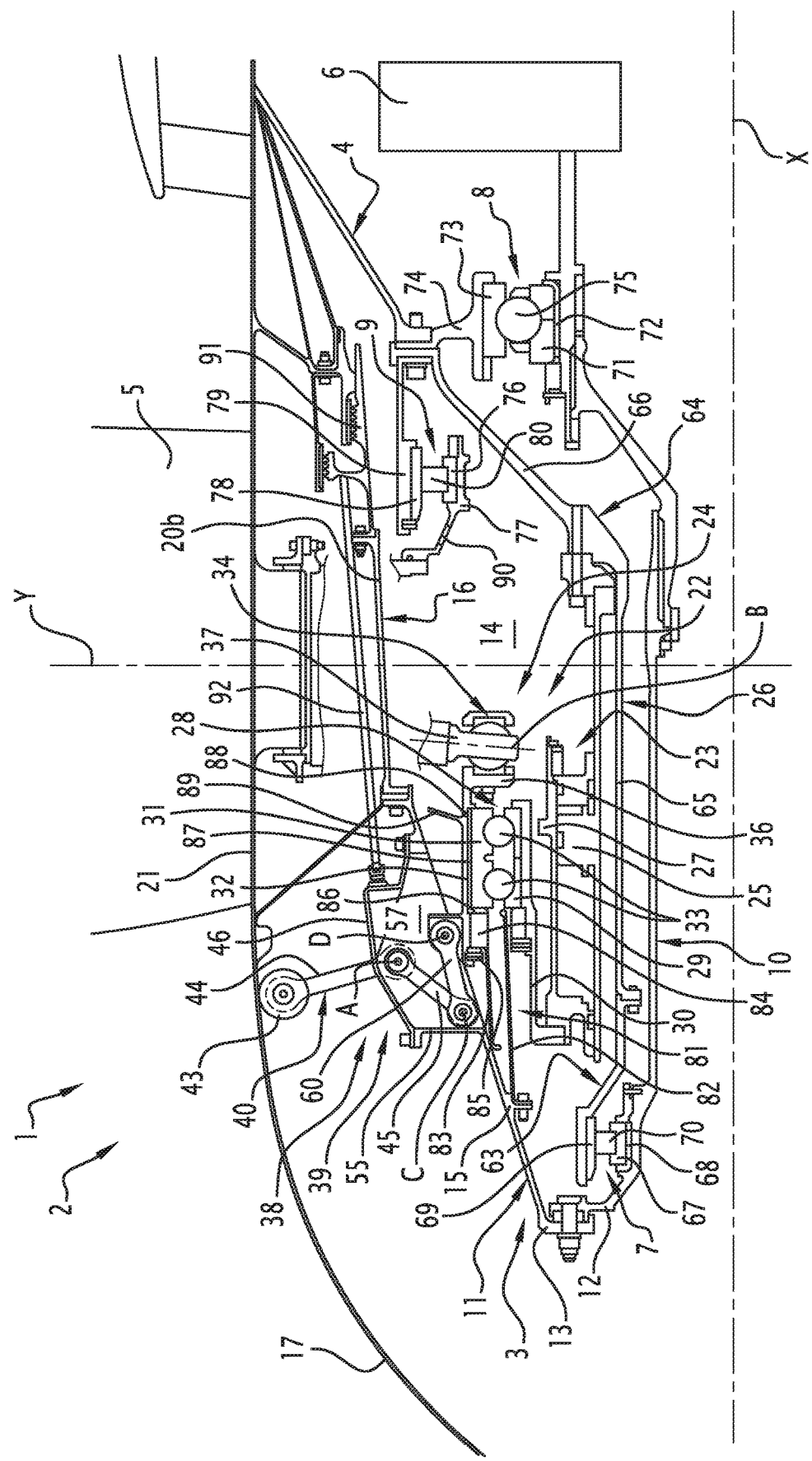
FIG. 2 is an axial half-section view of the fan module of FIG. 1, in which the device for feathering blades is in a second position, in an axial plane passing outside of the axis of rotation of a blade of the fan.
Figure 3:
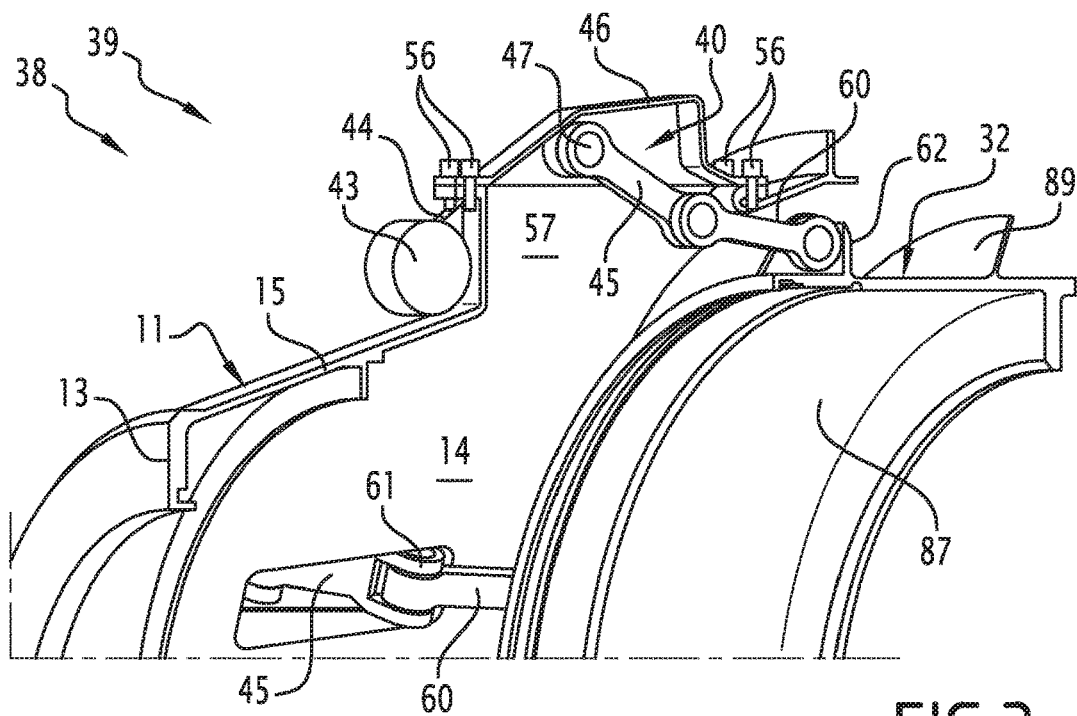
FIG. 3 is a detailed axial half-section perspective view of a mechanism of the device for feathering blades, of FIG. 1.
Figure 4:
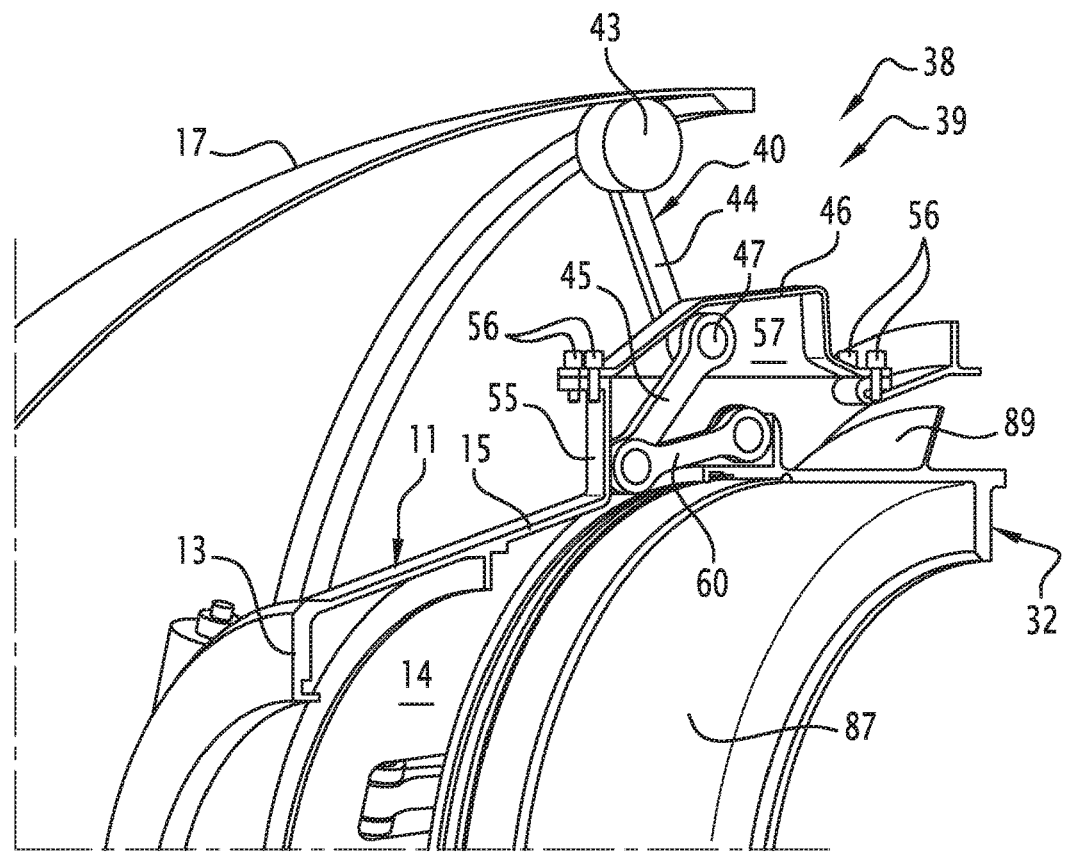
FIG. 4 is a detailed axial half-section perspective view of a mechanism of the device for feathering blades, of FIG. 2.

According to the embodiment illustrated in the Figures, and in particular FIGS. 1 and 2, the shaft 10 and the casing 11 form a pin, in axial half-section. The shaft 10 of the rotor 3 is driven by the power turbine via the speed reducer 6. The casing 11 comprises, from upstream to downstream, a frustoconical wall 15 that widens from upstream to downstream (with respect to the axis X) and a ring 16 for supporting the blades 5, this ring 16 being clamped on the wall 15. The rotor 3 further comprises an intake cone 17 of the fan 1, centered on the axis X and widening from upstream to downstream.

More specifically, each blade 5 has a foot, for example in the form of a bulb-shaped fastener, this foot being rigidly attached to a pivot 18 mounted in a recess 19 of a base 20a protruding from the ring 16 in such a way as to rotate about a substantially radial axis Y by means of two roller bearings. With reference to FIG. 2, the ring 16 comprises a substantially flat face 20b between two successive bases 20a.

The feet of the blades 5 are covered by an outer annular envelope 21, centered on axis X, with substantially circular cross-section, the latter being substantially tangential to the downstream end of the cone 17, in order to ensure aerodynamic continuity. The pivot 18 of each blade 5 is isolated from the annular space 14 by means of a cover (not illustrated). The rolling bearings located in each recess 19 are generally lubricated with grease.

As a reminder, the diameter of the outer envelope 21 at the leading edge of the blades 5 is one of the components which makes it possible to determine the hub ratio.

The fan 1 comprises a control device 22 for controlling the pitch of the blades 5 (or inclination of the blades 5) about their axis Y, and more specifically the pitch angle of the blades 5 which corresponds, for a blade 5, to the angle, in a longitudinal plane perpendicular to the axis Y, between the chord of the blade 5 and the plane of rotation of the fan 1. The control device 22 is situated in the annular space 14.

The blades 5 are positioned in "reverse thrust" position in FIGS. 1, 3, 5, 7 and 10. In the "reverse thrust" position, the pitch angle of the blades 5 is negative. This position of the blades 5 enables generation of a counter thrust, and thus contributes to the slowing down of the aircraft by complementing the brakes in such a way as to reduce the braking distance of the aircraft during landing.

The blades 5 are positioned in feathered position in FIGS. 2, 4, 6, 8, 11 and 12. In the feathered position, the pitch angle is positive and generally equal to 90°. This blade position 5 makes it possible to limit the resistance (drag) generated by the blades.

According to the embodiment illustrated in the Figures, and in particular FIGS. 1 and 2, the device 22 for controlling the pitch of the blades 5 comprises an annular linear actuator 23, centered on the axis X, common to all the blades 5 and a transformation device 24 for transforming the movement specific to each of the blades 5, this transformation device 24 being able to transform the linear movement initiated by the actuator 23 into a rotational movement of the corresponding blade 5.

More specifically, the linear actuator 23 has a fixed body 25 attached to an annular support 26 (centered on axis X) of the fixed housing 4 and a moving body 27 that can move in translation with respect to the fixed body 25 along the axis X. The linear actuator 23 is advantageously hydraulic.

The control device 22 further comprises a load transfer bearing 28, more commonly known by the acronym LTB, rigidly connected to the moving body 27 and enabling the transmission of the linear movement initiated by the actuator. The load transfer bearing 28 is a rolling bearing (centered on the axis X) comprising an inner ring 29 securely mounted on an inner synchronization ring 30 (centered on the axis X) rigidly connected to the moving body 27 of the actuator 23, and an outer ring 31 securely housed in an outer synchronization ring 32 driving the pitch of the blades 5. The inner and outer rings 29, 31 define two races for the rolling elements 33 (in this case balls 33). The balls 33 are in radial contact with the outer ring 31 and in oblique contact with the inner ring 29.

The LTB can ensure the transmission of the movement initiated by the linear actuator 23 (connected to the housing 4, fixed frame of reference) to the rotating frame of reference (connected to the rotor 3). Having a linear actuator in a fixed frame of reference facilitates its supply with oil and reduces the masses in rotation.

The device 24 for transforming the linear movement into a rotary movement comprises, for each blade 5, a spherical joint 34 (commonly called a ball joint) with radial contact and a crank 35. The spherical joint 34 is securely mounted in a bracket 36 of the outer synchronization ring 32. The spherical joint 34 comprises a sphere having a radial hole, this sphere being enclosed in a housing formed by two facing half-spheres respectively defined in two half-rings. The crank 35 has a finger 37 at each end, projecting in opposite directions, one of the fingers 37 being mounted free to rotate and move in translation in the hole of the corresponding sphere along a (substantially radial) axis B the other being coupled to rotate with the pivot 18 of the corresponding blade 5 (for example by means of a spline connection). The axis B is offset with respect to the axis of rotation Y of the blade 5. The crank 35 multiplies the force required to adjust the pitch of the corresponding blade 5.

The linear movement of the moving body 27 of the actuator 23 enables synchronized adjusting of the pitch of the assembly of blades 5 via, in particular, the outer ring 31 of the load transfer bearing 28.

The fan 1 also comprises a device 38 for feathering the blades 5, in particular in the event of failure (or breakdown) of the control device 22, and, for example, a failure in the hydraulic supply of the linear actuator 23. As a reminder, the feathered position corresponds to a positive pitch generally equal to 90°.

The feathering device 38 comprises at least one mechanism 39 having at least one lever 40 articulated about an axis A fixed with respect to the rotor 3. The lever 40 has a first end 41 situated outside of the space 14 and a second end 42 situated inside the space 14, a flyweight 43 being rigidly attached to the first end 41 and the second end 42 being coupled to the load transfer bearing 28. The flyweight 43 is capable, under the centrifugal effect, of being moved into a position (FIGS. 2, 4, 6, 8, 11 and 12) in which the load transfer bearing 28 imposes a feathered position on the blades 5.

According to the embodiment illustrated in FIGS. 5 and 6, the feathering device 38 comprises five mechanisms 39 angularly distributed in a regular manner about the axis X.

Figure 9:
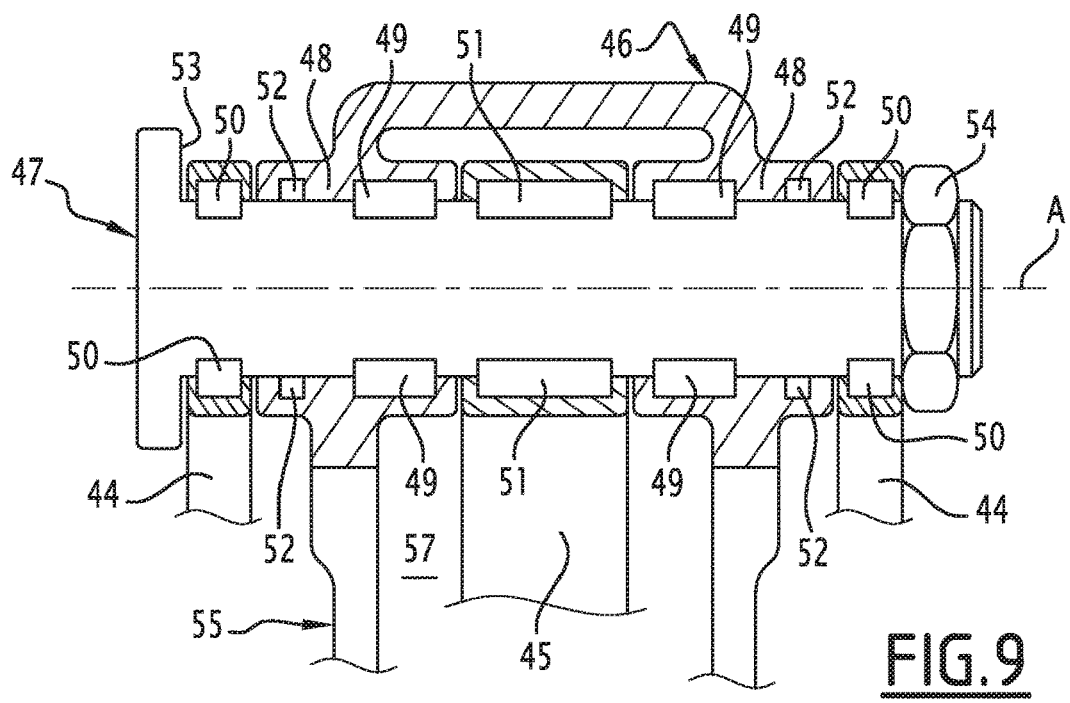
FIG. 9 is a schematic radial (or transverse) sectional view of a mechanism of the device for feathering blades, in a plane passing through the axis of rotation of a lever of said mechanism.

According to the embodiment illustrated in the Figures, and more specifically in FIGS. 7 to 9, for each mechanism 39, the lever 40 is L-shaped or V-shaped in axial cross-section (FIGS. 1 to 4). The lever 40 comprises two parallel synchronized arms 44 situated outside of the space 14 and a connecting rod 45 situated inside the space 14. The arms 44 and the connecting rod 45 are linked in rotation and articulated about the axis A with respect to a cover 46 of the casing 11, by means of a spindle 47 centered on the axis A. The axis A in this case is rectilinear and perpendicular to the axis X. The length of an arm 44 is greater than the length of the connecting rod 45, approximately two times greater in the present case. This length ratio makes it possible to multiply the force provided by each flyweight 43, and in other words to minimize their mass, and generally the mass of all the flyweights 43.

More specifically, as illustrated in FIG. 9, the spindle 47 passes (transversely) through the cover 46 from side to side and is guided in rotation with respect to the spans 48 of the latter by rotation guiding means 49. The rotation guiding means 49 are, for example, bearing bushes and/or rolling bearings, etc. The arms 44 laterally border the cover 46, each arm being rotationally connected to the spindle 47 by first rotational connection means 50. The connecting rod 45 is interspersed between the spans 48 of the cover 46 and is rotationally connected to the spindle 47 by second rotational connection means 51. The first and second rotational connection means 50, 51 are for example, pins and/or cotter pins and/or splines, etc. In order to ensure the sealing of the joint between the lever 40 and the cover 46, sealing means 52 are located between the spans 48 of the cover 46 and the spindle 47. The spindle 47 is axially stopped at one of its two ends by a shoulder 53 and by a nut 54 at its opposite end.

The cover 46 is curved and connected to a boss 55 of the casing 11, the boss 55 protruding radially towards the outside. The cover 46 is fixed to the boss 55 by means of three upstream screws 56 and three downstream screws 56 (FIGS. 7 and 8). The boss 55 and the corresponding cover 46 internally define between them, within the space 14, a cavity 57 (FIGS. 1 to 4). Sealing means (not illustrated) are interspersed between the cover 46 and the boss 55, in order to ensure the sealing between them.

For each mechanism 39, the flyweight 43 is cylindrical with circular cross-section or another appropriate shape, situated between the arms 44 and fixed at opposite ends to the axis A by means of screws 59 (FIGS. 7 and 8). The flyweight 43 is capable of moving in a longitudinal plane P (FIG. 1) perpendicular to the axis A between the casing 11 of the rotor 3, and the cone 17 and the envelope 21 of the rotor 3.

As illustrated in FIGS. 7 and 8, the second end 42 of the lever 40 is coupled to the load transfer bearing 28, and more specifically to the outer synchronization ring 32 by means of a rod 60. An upstream axial end of the rod 60 is articulated in a yoke 61 of the connecting rod 45 about an axis C and a downstream axial end of the rod 60 is articulated in a yoke 62 of the outer synchronization ring 32 about an axis D.

When the propulsion unit 2 operates in the normal way (no failure), the feathering device 38 is subordinate to the control device 22 for the pitch of the blades 5, and more specifically to the linear actuator 23. It should be noted that when the blades 5 are in the "reverse thrust" position, the flyweights 43 of the mechanisms 39 of the feathering device 38 of the blades 5 are close to and/or in contact with the casing 11 of the rotor 3 (FIGS. 1, 3, 5 and 7).

In the event of failure (the need to position the blades 5 in the feathered position), for example a failure in the hydraulic supply of the linear actuator 23, the control device 22 of the pitch of the blades 5 then becomes subordinate to the feathering device 38, and more specifically the flyweights 43 which, under the centrifugal effect, are located close to and/or in contact with the cone 17 (FIGS. 2 and 4), in order to impose a feathered position on the blades 5.

The rotation of the rotor 3 is guided with respect to the fixed housing 4 by at least a first bearing 7 situated upstream and at least a second and a third bearing 8, 9 situated downstream. The first, second and third bearings 7, 8, 9 have an outer diameter greater than the inner diameter of the support 26 under the linear actuator 23. The second and third bearings 8, 9 have an outer diameter greater than the outer diameter of the first upstream bearing 7.

Such an arrangement and dimensioning of the bearings 7, 8, 9 makes it possible to radially have a more compact annular space 14 (or oil enclosure), and thus to minimize the hub ratio, without however degrading the mechanical characteristics of the fan 1. On the other hand, this architecture makes it possible to significantly improve the dynamic equilibrium of the rotor 3. This improvement is explained in particular by the arrangement of the bearings 7, 8, 9 with respect to the resulting force which includes in particular the forces generated by the masses moving in rotation around the axis X (and in particular the mass of the control device 22 of the blades 5, the mass of the feathering device 38 of the blades 5 and the mass of the pivots 18 of the blades 5).

According to the embodiment illustrated in the Figures and in particular in FIGS. 1 and 2, the annular support 26 is centered on axis X and comprises, from upstream to downstream, an upstream section 63 and a downstream section 64 clamped to one another. The upstream section 63 is substantially frustoconical, widening from downstream to upstream. The downstream section 64 comprises, from upstream to downstream, a cylindrical portion 65 with semi-circular cross-section and a substantially tapered portion 66 widening from upstream to downstream.

The first and second bearings 7, 8 enable more precise guiding of the rotation of the shaft 10 of the rotor 3 with respect to the fixed housing 4.

The first bearing 7 is situated close to the axial upstream ends 12, 13 of the casing 11 and of the shaft 10, and in other words the first bearing 7 is upstream from the linear actuator 23, the load transfer bearing 28 and the mechanisms 39 of the feathering device 38 of the blades 5. The inner diameter of the first bearing 7 is greater than the outer diameter of the shaft 10 under the linear actuator 23. The first bearing 7 has an inner diameter less than the inner diameter of the load transfer bearing 28. The first bearing 7 is a rolling bearing (centered on the axis X) comprising an inner ring 67 mounted on an annular base 68 (centered on the axis X) attached to the shaft 10, and an outer ring 69 housed in the upstream section 63 of the support 26. The inner and outer rings 67, 69 define a race for the rolling elements 70 (in this case cylindrical rollers 70). The first bearing 7 is thus able to essentially support radial loads.

The second bearing 8 is situated downstream of the linear actuator 23 and upstream of the reducer 6. The inner diameter of the second bearing 8 is greater than the outer diameter of the first bearing 7. The second bearing 8 is a rolling bearing (centered on the axis X) comprising an inner ring 71 mounted on an annular seat 72 (centered on the axis X) attached to the shaft 10, and an outer ring 73 housed in an annular attachment 74 (centered on the axis X) clamped to the fixed housing 4. The inner and outer rings 71, 73 define a race for the rolling elements 75 (in this case balls 75). The balls are in radial contact with the inner and outer rings 71, 73. The second bearing 8 is thus able to support radial and axial loads.

The third bearing 9 enables more precise guiding of the rotation of the casing 11 of the rotor 3 with respect to the fixed housing 4.

The third bearing 9 is situated downstream of the control device 22 of the pitch of the blades 5 and upstream of the reducer 6. The inner and outer diameters of the third bearing 9 are greater than the outer diameter of the second bearing 8. The third bearing 9 has an inner diameter greater than the inner diameter of the load transfer bearing 28. The third bearing 9 is a rolling bearing (centered on the axis X) comprising an inner ring 76 mounted on an annular platform 77 (centered on the axis X) clamped on the support ring 16 of the blades 5, and an outer ring 78 housed in a crown 79 (centered on the axis X) clamped to the fixed housing 4. The inner and outer rings 76, 78 define a race for the rolling elements 80 (in this case rollers 80). In the same way as for the first bearing 7, the third bearing 8 it essentially capable of supporting radial loads.

It should be noted that each of the rings of the bearings (first bearing 7, second bearing 8 and third bearing 9) is axially stopped at one of its ends by a shoulder and at its opposite end by removable axial retaining means such as a circlip.

According to the embodiment illustrated in the Figures, the bearings (first bearing 7, second bearing 8, third bearing 9 and load transfer bearing 28) are lubricated using a liquid lubricant such as oil. Advantageously, each of the rolling bearings 7, 8, 9, 28 mentioned above is lubricated via a nozzle.

For reasons of clarity, the nozzles and the supply ducts are not illustrated in the Figures. The first bearing 7 is, for example, lubricated via a nozzle located downstream of the first bearing 7 and fixed to the upstream section 63. The second bearing 8 is, for example, lubricated via a nozzle located upstream of the second bearing 8 and fixed to the attachment 74. The third bearing 9 is, for example, lubricated via a nozzle located downstream of the third bearing 9 and 6 fixed to the crown 79. The load transfer bearing 28 is, for example, lubricated by a nozzle located upstream of the moving body 27 and attached to the inner synchronization ring 30, the lubricant being routed to the load transfer bearing 28 by means of recovery and guidance means 81. It should also be noted that for the load transfer bearing 28, the duct supplying the nozzle is telescopic and located between the moving body 27 of the actuator 23 and the inner synchronization ring 30.

According to the embodiment illustrated in the Figures, the fan 1 comprises means 81 for recovering and guiding the lubricant of the bearings 7, 8, 9, 28, the recovery and guidance means 81 being configured to recover and guide the lubricant from the axial upstream end 13 of the casing 11, axially from upstream to downstream and radially from the inside to the outside, under the centrifugal effect.

The evacuation of the lubricant injected into the space 14 (oil enclosure) via the various nozzles is common, so as to minimize the components of the hydraulic circuit (in particular the pumps). The evacuation of the lubricant is achieved via evacuation means 93, schematically illustrated in FIGS. 10 and 11. The recovery is generally carried out at the 6 o'clock position by analogy with the dial of a clock.

The recovery and guidance means 81 comprise an annular inner deflector 82 (centered on the axis X) clamped on the casing 11 and an annular outer deflector 83 (centered on the axis X) rigidly attached to the control device 22 of the blades 5, the outer deflector 83 being capable of enclosing, more or less, the inner deflector 82 (totally or partially overlapping), depending on the position of the moving body 27 of the actuator 23.

More specifically, the outer deflector 83 comprises a threaded annular collar 84, externally screwed into the outer synchronization ring 32 of the control device 22 so as to fix the outer ring 31. The collar 84 comprises a downstream face 94 bearing against the outer ring 31 of the load transfer bearing 28 and an upstream face 95 which bears against the axial retaining means 85 (for example, a snap ring on rotation of the collar in the present case).

Figure 10:
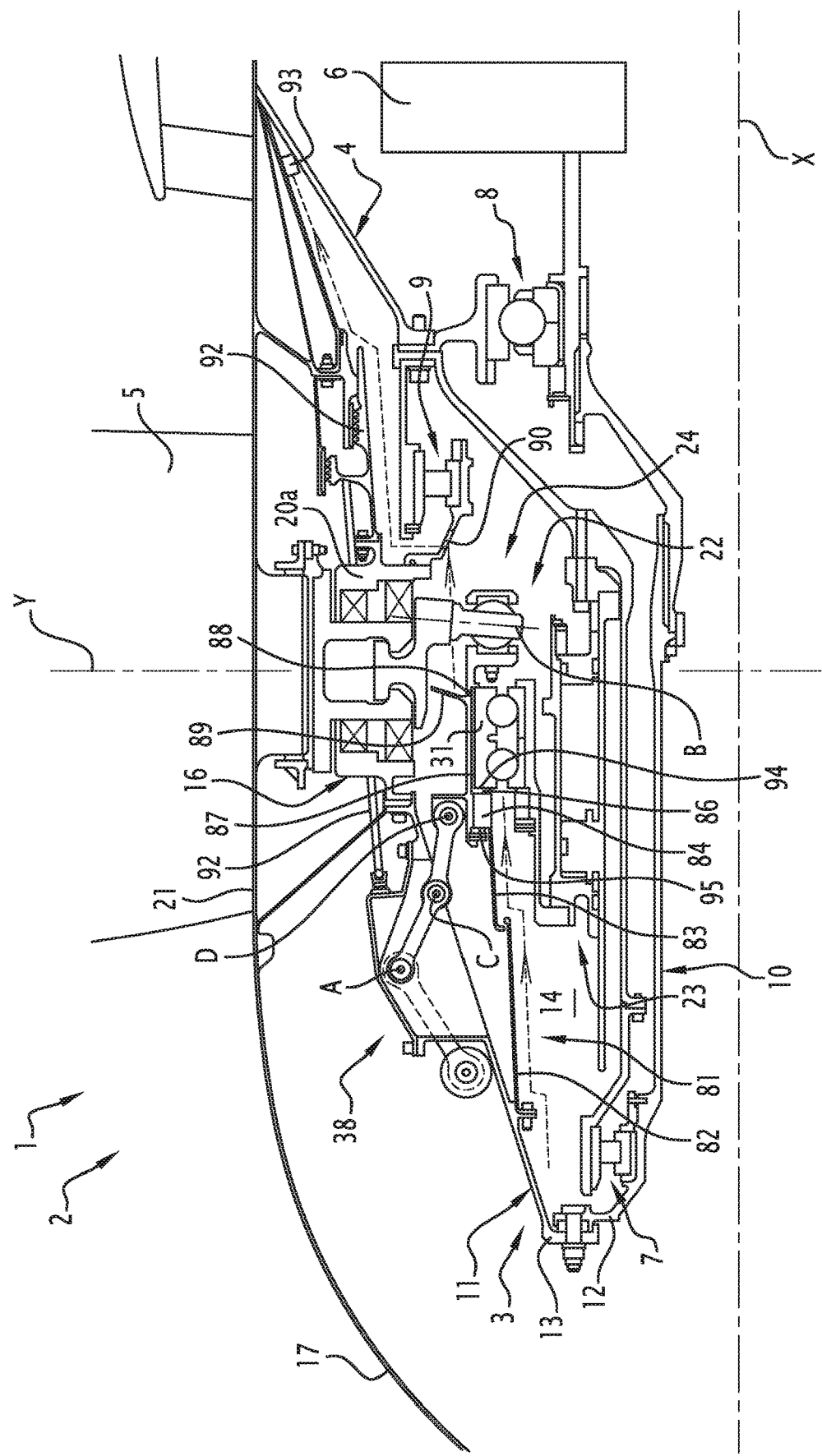
FIG. 10 corresponds to FIG. 1 and illustrates the recovery and guidance of the lubricant inside an annular space of the fan.

In order to allow the flow of the lubricant into the space 14, as illustrated in FIG. 10, the downstream face 94 of the collar 84 comprises radial notches 86 for passage of said lubricant. An inner circumferential surface of the outer synchronization ring 32 facing the outer ring 31 of the load transfer bearing 28 comprises axial notches 87 for passage of the lubricant. At the downstream end of the outer ring 31 of the load transfer bearing 28, the outer synchronization ring 32 comprises holes 88 for passage of the lubricant. The holes 88 are located downstream of a lip 89 for guiding the lubricant, this lip 89 projecting towards the outside from the outer synchronization ring 32. The platform 77 comprises a plurality of openings 90 for passage of the lubricant. Annular sealing wipers 91 (centered on X) are clamped on the support ring 16 of the blades 5, these wipers 91 surrounding the crown 79 of the fixed housing 4. The wipers 91 are located facing abradable coatings so as to form labyrinth-type sealed joints. Such joints significantly limit lubricant leaks and are conventionally used in order to guarantee the seal between a rotor portion and a stator portion of an oil enclosure.

Figure 11:
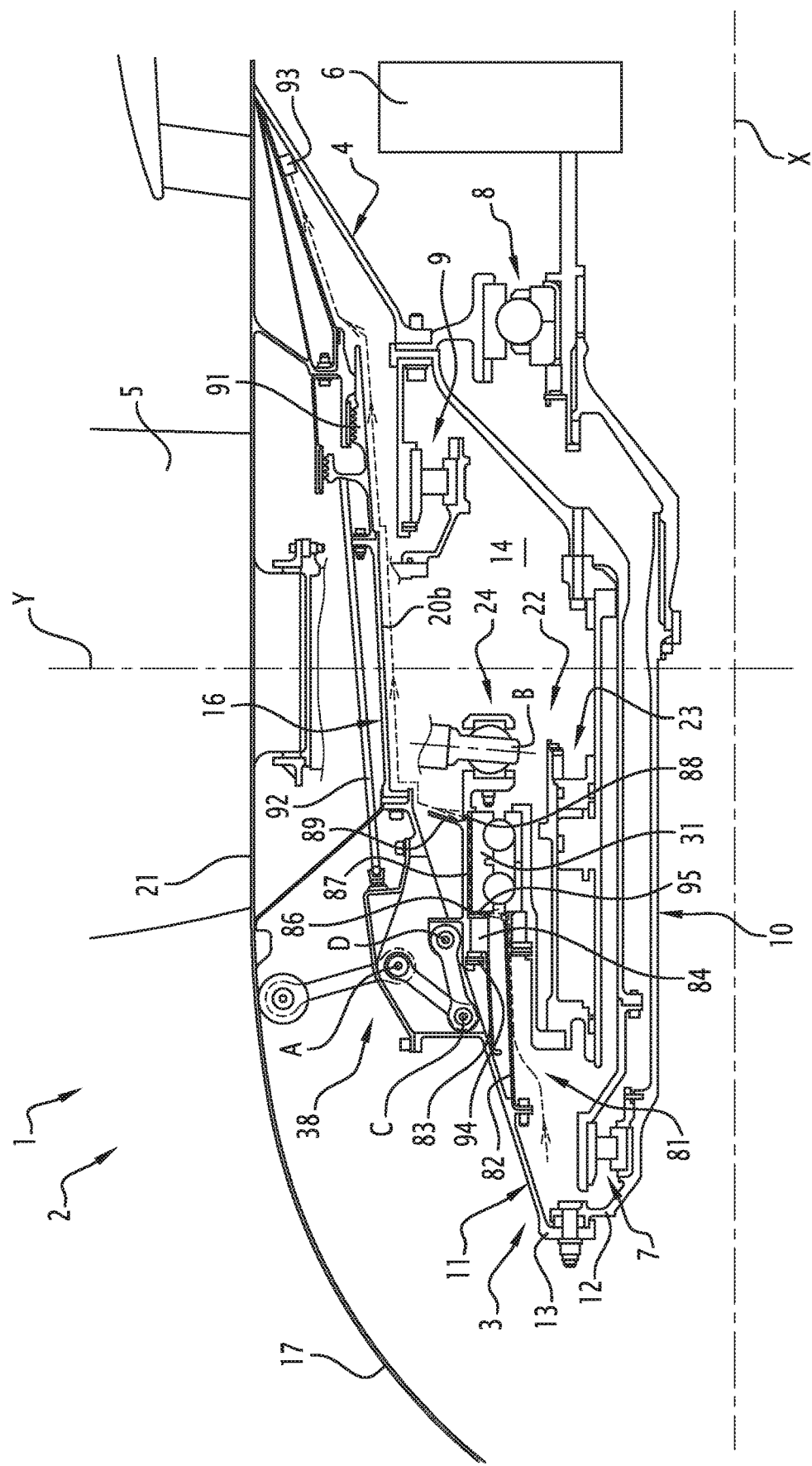
FIG. 11 corresponds to FIG. 2 and illustrates the recovery and guidance of the lubricant inside an annular space of the fan.

As illustrated in FIGS. 10 and 11, under the centrifugal effect, the lubricant (represented by the dashed arrow) is projected towards the outside, flowing from the axial upstream end 13 of the casing 11, axially from upstream to downstream and radially from the inside towards the outside. The lubricant flows at least consecutively over (or in) the inner deflector 82, the outer deflector 83, the radial notches 86, the axial notches 87, the holes 88, the lip 89, the faces 20b or the openings 90, and the wipers 91.

With reference to FIG. 11, it is however noted that the lubricant flows primarily under the centrifugal effect over the faces 20b of the ring 16. The casing 11 then comprises, between two successive bases 20a of the ring 16, a main axial path (faces 20b) for passage of the lubricant.

In order to avoid the lubricant being trapped (or stored) in the cavities 57 and so as not to create imbalances harmful to the dynamic equilibrium of the rotor 3 of the fan 1, for each mechanism 39 of the feathering device 38 of the blades 5, a drain 92 collects the lubricant present in the corresponding cavity 57 then evacuates it into a downstream portion of the space 14. In this case each drain 92 has a circular cross-section, inclined from the inside towards the outside, in order to facilitate the flow of the lubricant. Each drain 92 evacuates the lubricant into the space 14 downstream of the support ring 16 of the blades 5.

Figure 12:
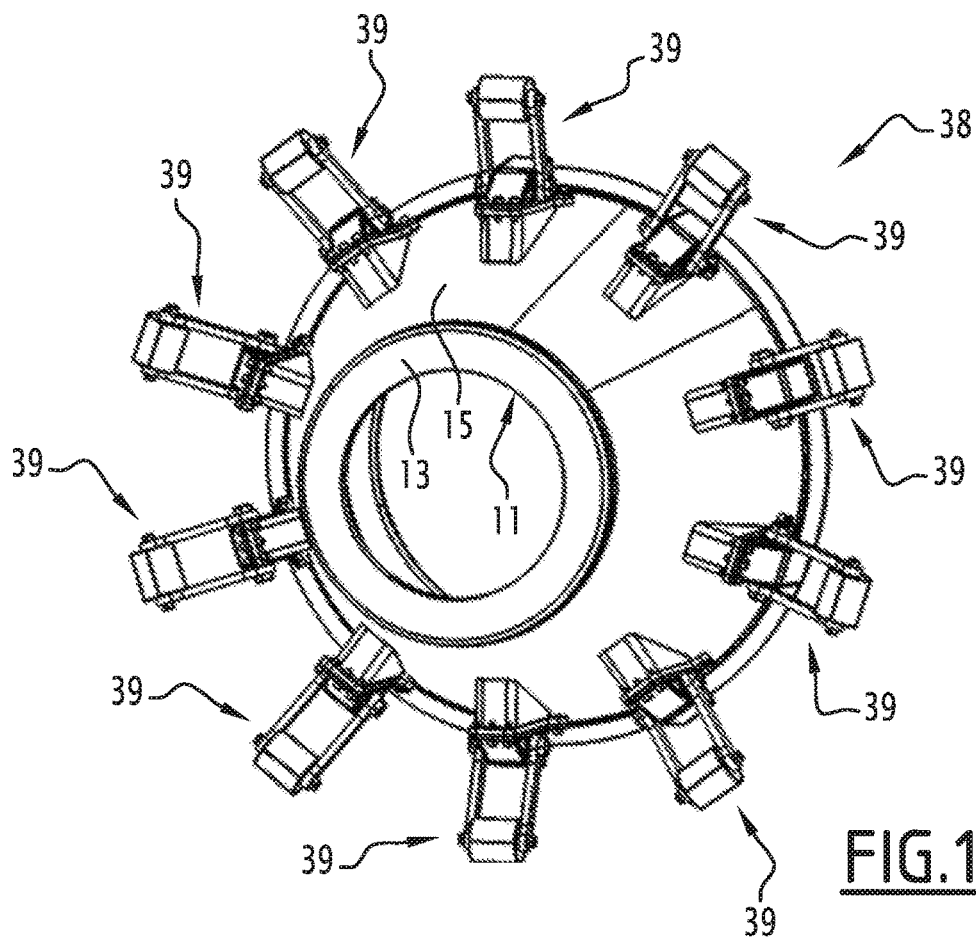
FIG. 12 is a perspective view of an alternative embodiment of the feathering device.

An alternative embodiment is illustrated in FIG. 12, in which the feathering device 38 of the blades 5 comprises 10 mechanisms 39 angularly distributed in a regular manner around the axis X.

It should be noted that the examples illustrated in the Figures are not limiting, as the feathering device 38 of the blades 5 according to the disclosure could, for example, be incorporated with the rotor of a propeller of a turboprop engine or with the rotor of each of two propellers of a turbo machine comprising contra-rotating propellers, more commonly known as an "open rotor". As used herein, the term "fan" also covers the propeller or propellers of such turbomachines.

Such a feathering device 38 applies more generally to any turbomachine comprising a device for controlling the pitch of the blades, for which a feathering device is necessary.

The invention claimed is:

1. A fan module with variable pitch blades for a propulsion unit with a longitudinal axis, the fan module comprising:
a rotor carrying the variable pitch blades, and comprising an annular inner shaft and an annular outer casing extending around the shaft, wherein an axial upstream end of the shaft is connected to an axial upstream end of the casing, with the shaft and the casing defining between them an annular space;
a control device for controlling the pitch of the variable pitch blades, the control device being situated in the annular space and comprising a load transfer bearing; and
a feathering device for feathering the variable pitch blades, the feathering device being situated upstream of the load transfer bearing;
wherein the rotation of the rotor is guided with respect to a housing by at least a first bearing situated in the vicinity of the axial upstream ends of the annular inner shaft and annular outer casing, said first bearing having an inner diameter that is less than the inner diameter of the load transfer bearing and said first bearing being situated upstream of the feathering device; and
means for recovering and guiding a liquid lubricant of the first bearing, said recovery and guidance means being configured to recover and guide said lubricant from the axial upstream end of the annular outer casing, axially from upstream to downstream, and radially from the inside to the outside, under the centrifugal effect.

2. The fan module according to claim 1, wherein the recovery and guidance means comprise an annular inner deflector rigidly connected to the annular outer casing and an annular outer deflector rigidly connected to the control device, the outer deflector at least partially enclosing the inner deflector.

3. The fan module according to claim 2, wherein the annular outer deflector comprises a collar screwed into an outer synchronization ring of the control device, and a downstream face of the collar bears against an outer ring of the load transfer bearing and an upstream face of the collar bears against an axial retaining means.

4. The fan module according to claim 3, the downstream face comprises radial notches for passage of the lubricant, and an inner circumferential surface of the outer synchronization ring facing the outer ring of the load transfer bearing comprises axial notches for passage of the lubricant.

5. The fan module according to claim 1, wherein the rotation of the rotor is guided with respect to the housing by at least a second and a third bearing situated downstream of the load transfer bearing, said third bearing having an inner diameter greater than the inner diameter of the load transfer bearing.

6. The fan module according to claim 5, wherein at least one of said first, second, and third bearings is lubricated via a nozzle.

7. The fan module according to claim 6, wherein the third bearing guides the annular outer casing with respect to the housing, and wherein the third bearing is a rolling bearing comprising an outer ring and an inner ring separated by rolling elements, with said outer ring mounted in an annular crown attached to the housing and with said inner ring mounted on an annular platform attached to the casing.

8. The fan module according to claim 7, wherein the annular platform comprises a plurality of openings for passage of the lubricant.

9. The fan module according to claim 1, wherein the annular outer casing comprises a ring having support bases for the blades, and wherein the casing comprises, between two successive bases, an axial path for passage of the lubricant.

10. The fan module according to claim 1, wherein the first bearing is lubricated via a nozzle.

11. A fan module, comprising:
a rotor carrying variable pitch blades and configured to move relative to a fixed housing, the rotor comprising an inner shaft centered on a longitudinal axis and an outer casing extending around said shaft, wherein an axial upstream end of said shaft is connected to an axial upstream end of said casing, with said shaft and said casing defining between them an annular space;
a control device for controlling the pitch of the variable pitch blades, the control device being situated in the annular space and comprising a load transfer bearing;
a feathering device for feathering the variable pitch blades, the feathering device being situated upstream of the load transfer bearing;
at least one bearing configured to guide the rotation of the rotor with respect to the housing, the at least one bearing situated upstream of the load transfer bearing; and
an annular inner deflector rigidly connected to the annular outer casing and an annular outer deflector rigidly connected to the control device, with the outer deflector at least partially axially overlapping the inner deflector;
wherein the inner and outer deflector are configured to cooperate to recover and guide said lubricant from the axial upstream end of the annular outer casing, axially from upstream to downstream, and radially away from the longitudinal axis, under the centrifugal effect.

* * * * *